March 29, 1932.  F. A. ROCKSTAD  1,851,869

SICKLE GUARD

Filed May 27, 1930  2 Sheets-Sheet 1

F. A. Rockstad INVENTOR

BY *Victor J. Evans*
ATTORNEY

March 29, 1932. F. A. ROCKSTAD 1,851,869
SICKLE GUARD
Filed May 27, 1930 2 Sheets-Sheet 2
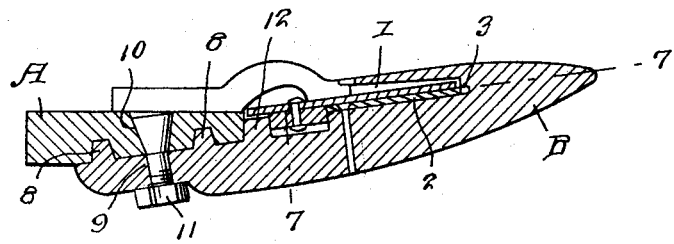
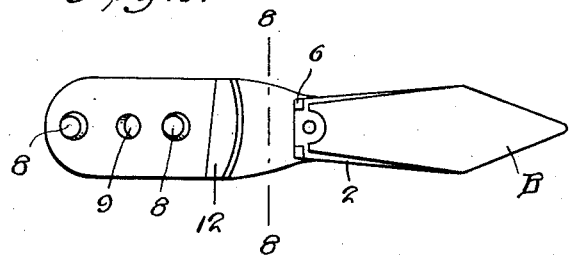
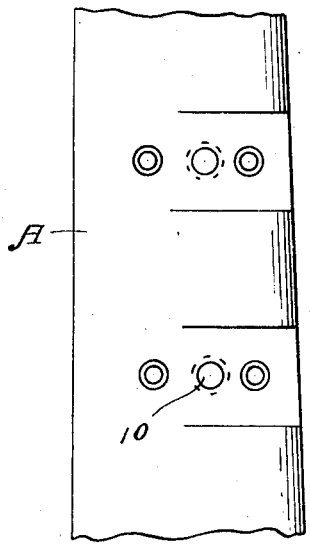
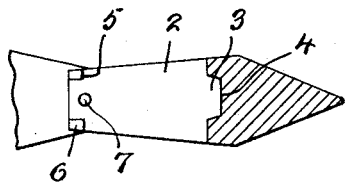
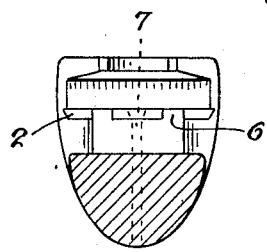
F. A. Rockstad
INVENTOR
BY Victor J. Evans
ATTORNEY Patented Mar. 29, 1932

1,851,869

UNITED STATES PATENT OFFICE

FRED A. ROCKSTAD, OF THIEF RIVER FALLS, MINNESOTA

SICKLE GUARD

Application filed May 27, 1930. Serial No. 456,266.

This invention relates to improvements in mowing machines, the general object of the invention being to provide the guard fingers with rearwardly tapered side portions, and a ledger blade for each finger having its sides tapered from the front to the rear to conform with the tapered shape of the finger so that the stationary cutting members taper in an opposite direction from the blades so as to increase the cutting action.

A further object of the invention is to provide novel means for connecting the bar fingers with the bar.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompany drawings wherein like characters denote like or corresponding parts throughout the several views, and in which:—

Figure 4 is a section on line 4—4 of Figure 2.

Figure 5 is a top plan view of one of the fingers.

Figure 6 is a fragmentary bottom plan view of the supporting bar.

Figure 7 is a section on line 7—7 of Figure 4.

Figure 8 is a section on line 8—8 of Figure 5.

Figure 1:
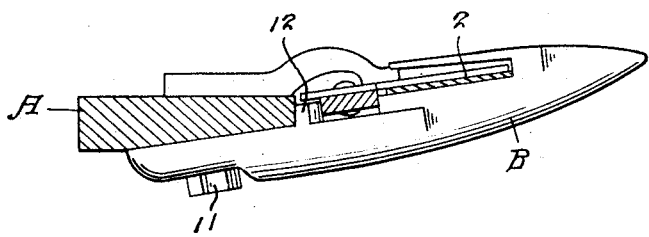
Figure 1 is a section on line 1—1 of Figure 2.
Figure 2:
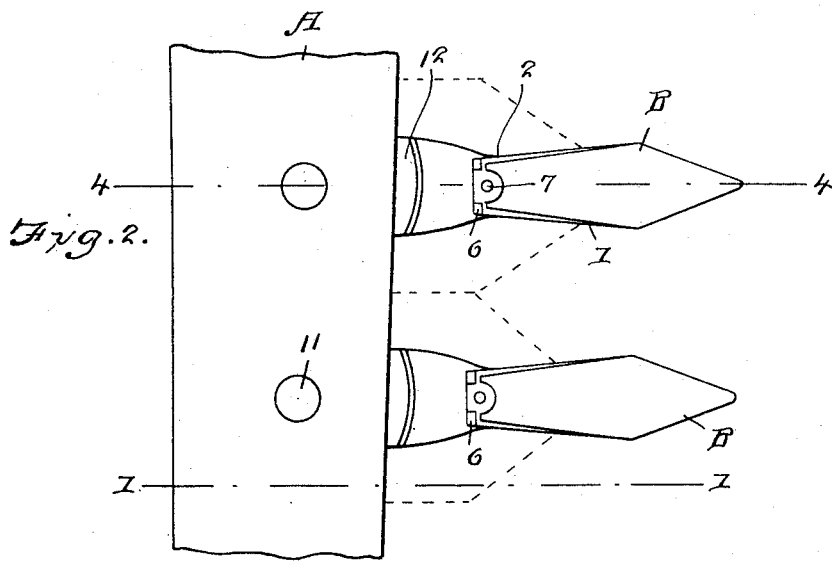
Figure 2 is a fragmentary plan view of the invention.
Figure 3:
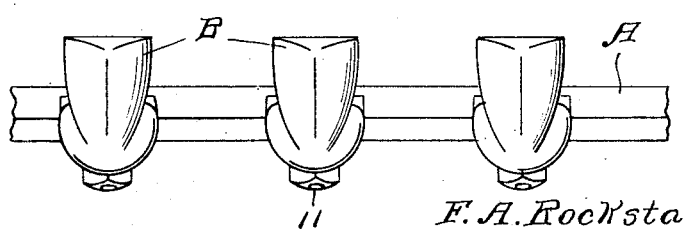
Figure 3 is a fragmentary front view.

In these views the letter A indicates the sickle bar and the letter B indicates the guard fingers. Each finger has its sides tapered rearwardly from a point a short distance from the front end of the knife slot to the rear end of the slot shown at 1 so that the one end of the slot is wider than its rear end and the ledger blade 2 is similarly shaped so that this blade tapers from its forward end to its rear end. Thus each ledger blade tapers in an opposite direction from the knives, thereby increasing the cutting action and gives the sickle a better hold on the grass or grain. Each ledger blade has a projection 3 at its front end fitting in a recess 4 in the front end of the slot and recesses 5 are formed at the sides of the rear end of the blade to receive the projections 6 on the finger. The pin 7 holds the rear end of the blade to the finger.

The rear end of each finger is formed with a pair of projections 8, one on each side of the hole 9, these projections fitting in the recesses in the supporting bar A when the finger is attached to the bar by the bolt 11. The bolt 11 fits in an opening 10 in the bar A. A cross piece 12 is formed on each finger and engages the front edge of the bar. Thus each finger is firmly secured to the bar and there is no danger of it moving sidewise or getting out of parallelism with other fingers.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A guard finger consisting of a body having a knife slot leading from the intermediate portion thereof to a point spaced from the forward end, the side edges of the body along said slot converging toward each other in straight lines at equal angles from points in advance of the forward end of the slot and spaced from each other at the rear end of the slot, there being a bar groove disposed transversely across the body at the rear end of the slot, said body having a recess at the forward end of the slot and upstanding projections at the rear end of the slot, and a ledger plate resting upon the lower side of the slot and having an end portion entering said recess and straight side edges parallel with the converging side edges of the slot, said plate having recesses at its rear end which receive said projections.

In testimony whereof I affix my signature.

FRED A. ROCKSTAD.